Figure 4:
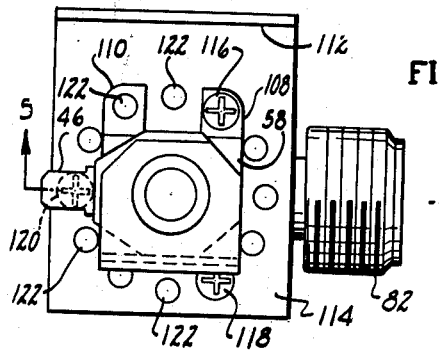

March 12, 1963

T. E. NOAKES 3,080,889

SOLENOID VALVE

Filed June 12, 1961

INVENTOR.
THOMAS E. NOAKES
BY Andrew K. Jouds
his ATTORNEY

United States Patent Office 3,080,889
Patented Mar. 12, 1963

3,080,889
SOLENOID VALVE
Thomas E. Noakes, Detroit, Mich., assignor to American Radiator & Standard Sanitary Corporation, New York, N.Y., a corporation of Delaware
Filed June 12, 1961, Ser. No. 116,577
6 Claims. (Cl. 137—623)

This invention relates to solenoid valves, and particularly to solenoid-valve body-mounting bracket relationships whereby the entire assemblies can be conveniently mounted in very close quarters, as for example in automatic washing machines and automotive vehicle engine compartments.

One conventional solenoid valve comprises a valve housing, a mounting bracket of right angular configuration having one leg thereof seated against a surface of the valve housing, a solenoid having apertured support ears seated on the leg of the bracket, and securing screws extending through the solenoid ears and mounting bracket leg into suitable openings in the valve housing. With the conventional arrangement the valve housing inlet has limited adjustability with respect to the fixed mounting bracket, and the terminals of the solenoid (which usually extend axially from one end of the solenoid) have substantially no adjustability with respect to the mounting bracket. Different makes and models of washing machines have different spaces available for the solenoid valves, different arrangements of fluid conduits, and different wiring harness arrangements so that the aforementioned non-adjustable character of the valve housing inlets and solenoid terminals presents problems insofar as the ability of a single solenoid valve assembly to be fitted into different makes and models of washing machines. Similar problems may exist in other environments, as for example in the compartments of automotive vehicle engines.

One object of the present invention is to provide a solenoid valve construction wherein the solenoid terminals extend laterally from the solenoid as distinguished from axially or upwardly, thereby minimizing or reducing the over-all height of the solenoid valve structure.

A further object of the invention is to provide a solenoid valve construction wherein the solenoid can be secured to the valve housing in various different positions of rotated adjustment to thus allow different placement of the solenoid terminals in accordance with the wiring leads of various different installations, the general objective being to prevent entanglement of the various electrical wires and to shorten the length of the wires as much as possible.

A further object of the invention is to provide a solenoid valve construction wherein the valve housing can be adjusted with respect to its mounting bracket, thereby enabling the valve housing inlets to be selectively located at different positions relative to the mounting bracket, to thus accommodate the valve body to different conduit relationships, the general objective being to economize on the over-all length of tubing required in each of several different installations.

A still further object of the invention is to provide a solenoid valve construction wherein the solenoid and valve housing are independently adjustably related to a common mounting bracket so that a single standard valve construction may be suited to various different electrical wiring environments and fluid conduit environments.

Other objects of this invention will appear from the following description and appended claims, reference being had to the accompanying drawings forming a part of this specification wherein like reference characters designate corresponding parts in the several views.

Figure 3:
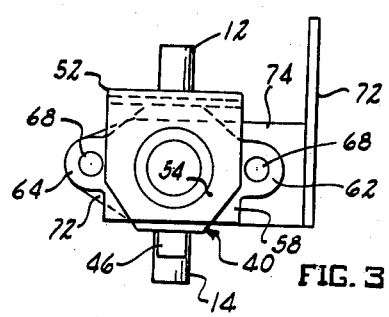
Figure 5:
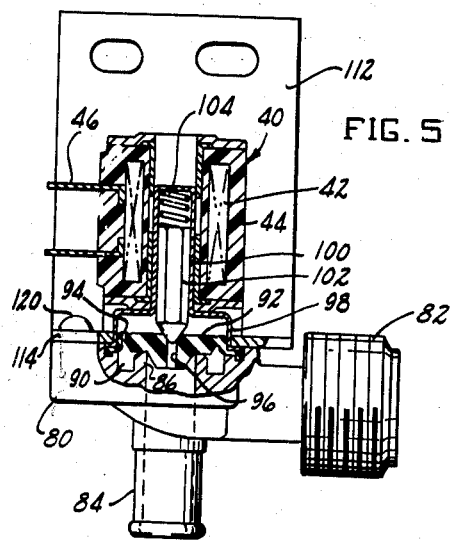
Figure 6:
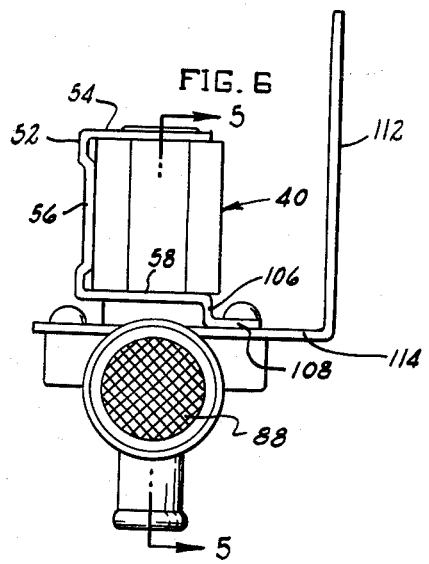
Figure 1:
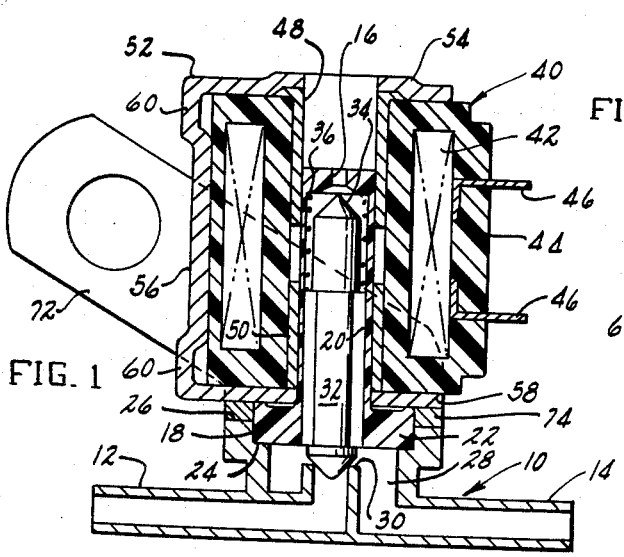
Figure 2:
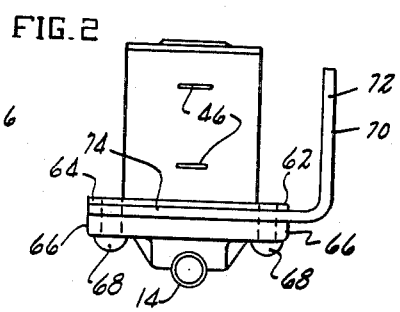

In the drawings:
FIGURE 1 is a sectional view taken through one embodiment of the invention;
FIG. 2 is a right end elevational view of the FIG. 1 embodiment, taken on the reduced scale;
FIG. 3 is a top plan view of the FIG. 2 construction;
FIG. 4 is a top plan view of a second embodiment of the invention;
FIG. 5 is an elevational view of the FIG. 4 embodiment, with parts thereof sectioned on lines 5—5 in FIGS. 4 and 6; and
FIG. 6 is a right end elevational view of the FIG. 5 construction.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring in greater detail to the drawings, particularly FIG. 1, there is shown a solenoid valve construction including a valve housing 10 having a first port 12 and a second port 14. A third port 16 is formed in the upper end of a solenoid guide structure 18, said guide structure including a generally tubular upstanding portion 20 and an annular thickened flange or base portion 22. As show in FIG. 1, base portion 22 is seated in a cylindrical recess 24 formed in surface 26 of housing 10.

The valve housing is suitably made hollow to form a generally annular chamber 28 and valve seat 30, said valve seat being adapted to be opened and closed by the solenoid armature 32. It should be noted that the central portion of armature 32 is of hexagonal configuration, while the solenoid guide portion 20 is of cylindrical configuration so that when the armature is in its lower position fluid communication is established between annular chamber 28 and port 16. The armature is provided with a cylindrical upper portion which terminates in a generally conical upper tip portion 34 so that when the solenoid 40 is energized to raise the armature the port 16 is sealed. A light compression spring 36 is provided within the solenoid guide to insure return of the armature to its lowered position when the solenoid is de-energized.

From the above brief discussion it will be seen that when the solenoid armature is in the raised position port 12 is placed in communication with port 14, and when the armature is in the lowered position port 16 is placed in communication with port 14. This particular valve construction could be used in a number of different installations, one of which is between the manifold of an internal combustion engine and the clutch diaphragm of the engine's automatic transmission. In such an installation port 14 is connected with the clutch diaphragm and port 12 is connected with engine manifold so as to be subject to manifold vacuum. Port 16 is exposed to the atmosphere. With this arrangement, when the solenoid is de-energized the clutch diaphragm is isolated from the engine vacuum so as to be positioned in accordance with atmospheric pressure and a diaphragm spring (not shown). When the solenoid is energized the engine vacuum is applied through port 12, thence past seat 30 to port 14 and thence to the clutch diaphragm to operate same to its other position of adjustment.

The solenoid operator for the FIG. 1 valve includes a coil portion 40 comprised of the windings 42 and the molded plastic sheathing 44. The laterally extending spade-type terminals 46 for windings 42 are secured in place by the molding operation. Coil 40 is, after its formation, provided with two steel tubular members 48 and 50, after which the coil is snap mounted within a C-shaped frame 52 having an upper leg 54, a web 56, and a lower leg 58. The central portion of web 56 is initially formed to be displaced inwardly of the end portions 60 to rigidify the C-frame and minimize any spring-back of the frame legs 54 and 58 when the coil 40 is snapped into place during assembly. As best shown in FIG. 3, coil 40 is of generally hexagonal configuration so that one of its side surfaces is flat for engaging the web portion 56 of the frame and preventing any inadvertent turning of the coil in service such as might be caused by vibrational force or the like.

Referring to FIG. 3, the lower leg 58 of frame 52 is provided with two apertured ears 62 and 64 which align with suitable apertures formed in the flange portions 66 of valve housing 10 (see FIG. 2). Suitable securing elements such as screws or rivets 68 are extended through the aligned apertures to secure the solenoid on the valve housing. There is also provided a mounting bracket 70 which includes an upstanding leg 72 and a generally laterally extending leg 74. Leg 74 is formed with apertures alignable with the aforementioned solenoid apertures and valve housing apertures so that securing elements 68 are effective to mount the valve housing and solenoid on the supporting bracket 70.

It will be noted that the two series of alignable apertures are located concentrically with respect to the axis of the solenoid armature 32 and valve seat 30. With this arrangement it is possible to independently vary the position of the valve housing and solenoid relative to the mounting bracket. Thus, as shown in FIG. 1 the valve housing is arranged with port 12 on the left and port 14 on the right; however, by merely reversing the position of valve housing 10 port 14 may be located on the left and the port 12 located on the right. As shown in FIG. 1, terminals 46 extend to the right from the solenoid structure; however, by installing the solenoid construction with ears 62 and 64 in reverse positions it is possible to dispose the terminals 46 so they extend to the left.

The above independent adjustments in the positions of the ports and terminals is advantageous in that they permit the solenoid valve construction to be more readily adapted to different wiring and fluid conduit environments, particularly in the fact that they minimize any entangling of the lead-in wiring, shorten the lengths of wiring required, prevent excessive bending of flexible fluid conduits, shorten the length of fluid conduit required, and obviate the need for excessive space which would otherwise be needed to accommodate excessively long conduits and wiring harness arrangements.

Referring to FIGS. 4, 5 and 6, the invention is there shown as applied to a solenoid valve construction useful in automatic clothes washing machines to supply hot or cold water. As shown in FIG. 5, the valve comprises a valve housing 80 having an inlet 82, an outlet spigot 84 and a valve seat 86.

Inlet portion 82 may if desired be provided with a strainer screen 88 (FIG. 6) and a resilient flow control annulus (not shown). A suitable fluid passage is provided between the flow control annulus and the annular inlet chamber 90 which surrounds seat 86. In order to control the flow past seat 86 there may be provided a rubber diaphragm 92 having a small bleed port 94 and a cnetral port 96. The peripheral edge portion of the diaphragm extends beneath the annular flange portion of a cup-like cover 98 having a tubular extension 100 which forms a guide for the armature 102. As in the previously described construction, a light compression spring 104 may be provided to insure that armature 102 is moved to a lowered position when the solenoid coil 40 is de-energized. The solenoid is in many respects similar to the solenoid shown in FIG. 1, and similar reference numerals are therefore used wherever applicable.

Referring to FIG. 6, it will be seen that the C-frame 52 for the solenoid coil is provided with a short downwardly extending leg portion 106 and a laterally extending ear portion 108. As will be seen from FIG. 4, there is provided a second ear 110. Although not apparent from the drawings, ear 110 is identical with ear 108 and is connected to the lower leg portion 58 of the C-frame by a leg similar to leg 106. If desired the two ears could be connected by an integral bridging wall for strength purposes.

The mounting bracket for the FIG. 4 construction is configured to define an upstanding leg portion 112 and a generally laterally extending leg portion 114. As shown in FIG. 5, leg portion 114 is provided with a central opening so as to fit over the flange of the cup-like cover 98. As shown in FIG. 4, three screws 116, 118 and 120 are extended through bracket portion 114 and into suitable threaded apertures in valve housing 80 to secure the valve housing to the mounting bracket. These three screws are concentrically disposed with respect to the axis of armature 102 and are equidistantly spaced from one another so that the valve housing 80 may be disposed with its mounting apertures engaged with different ones of the screws, thereby permitting rotary adjustment of the valve housing such that inlet 82 can be located at different selected positions relative to the support leg 112 of the mounting bracket.

The housing 80 is preferably provided with only three mounting apertures (for screws 116, 118 and 120), while bracket portion 114 is preferably provided with twelve apertures 122. These last-mentioned apertures are arranged concentrically about the axis of armature 102 and are equidistantly spaced from one another so that the valve housing may be adjustably located in a large number of different positions; this permits valve housing inlet 82 to be disposed in the most advantageous position for receiving the flexible inlet conduit, no matter on what make or model washing machine the particular valve is being used.

It will be noted from FIG. 4 that only one of ears 108 and 110 is utilized to secure the solenoid construction to the mounting bracket portion 114. Thus, ear portion 108 may underlie the head of screw 116 whereas ear 110 may have no screw extending therethrough. It has been found that the solenoid can be adequately supported with but one screw as shown in the drawings. The purpose in utilizing two ears 110 and 108 is to permit the solenoid construction to be adjustably disposed in a large number of different positions while still using only the three mounting screws 116, 118 and 120. Thus with any given positional relationship between valve housing 80 and mounting bracket portion 114 there are six different available positions of the solenoid. For example, ear 108 can underlie any one of the three screws 116, 118 and 120, to thus give three different positions for the terminals 46; additionally the solenoid can be positioned with ear 110 underlying any of the three screws 116, 118 or 120, to thus give three other positions of the terminals 46. By this arrangement it is possible to in a practical sense independently adjust the solenoid and the valve housing relative to the mounting bracket. This permits a single valve construction to be utilized in a large number of different makes and models of washing machines without requiring the valve manufacturer or distributor to carry a large inventory of different brackets and solenoids. The washing machine manufacturer is thus assured that in all situations there will be minimum lengths of wiring, freedom of wire entanglements, minimum lengths of fluid conduit, lack of excessive conduit twisting or bending, and better machine utilization of internal space. The fact that the terminals 46 extend laterally from the solenoid coil instead of axially contributes toward the wiring advantages beside additionally contributing toward compactness in the over-all size of the solenoid valve construction.

The invention has been illustrated in FIGS. 4 through 6 as applied to a single solenoid washing machine valve. This has been done primarily for simplification of illustration and description; however, it will be understood that the invention can be employed with valves having two or more solenoids. Such multi-solenoid valves are commonly employed to regulate the relative amounts of hot and cold water introduced into the washing machine. Various modifications and redesigns may of course be resorted to without departing from the spirit of the invention as set forth in the appended claims.

I claim:

1. In a valve housing having a fluid inlet, a fluid outlet and a valve seat therebetween; said valve housing further having a mounting surface arranged in surrounding relation to the valve seat; a mounting bracket having a portion arranged on said mounting surface; said bracket portion and mounting surface each having at least two evenly spaced securement apertures arranged concentrically about the axis of the valve seat; a tubular guide structure extending outwardly from the valve housing in axially aligned relation with respect to the valve seat; and an armature slidably positioned within the tubular guide structure for movement toward and away from the valve seat; the improvement comprising a solenoid operator, including a C-shaped frame and an annular coil portion nested therewithin in surrounding relation to the tubular guide structure; terminals extending laterally from one of the side surfaces of the coil; at least one apertured ear extending from the frame and seated on the aforementioned bracket portion with its aperture aligned with one of the bracket portion apertures; and securing elements releasably extending through the aligned apertures to thus permit adjustment in the position of the terminals and fluid inlet.

2. In a valve housing having a flow-controlling diaphragm therein; a cover structure overlying the diaphragm; an armature arranged within the cover structure to move toward and away from the diaphragm to control its position in the valve housing; and a mounting bracket having a portion thereof seated on a surface of the valve housing and operable to retain the diaphragm and cover structure in an operating position; the improvement comprising a solenoid operator for the armature, including a generally C-shaped frame and a coil nested therewithin; said C-shaped frame having an apertured ear extending therefrom along a surface of the aforementioned bracket portion; the aforementioned valve housing surface having three mount apertures equidistantly spaced one from another and concentric with the axis of the armature; said mounting bracket having at least six equidistantly spaced securement apertures arranged the same distance from the armature axis as the aforementioned valve housing apertures; and three securing elements extending into the three housing apertures, selected ones of the bracket portion apertures.

3. In a valve housing having a valve seat, and a number of mounting apertures evenly spaced from one another and concentrically arranged with respect to the valve seat; and a reciprocable armature axially aligned with the valve seat for controlling the flow therethrough; the improvement comprising a solenoid operator for said armature, including a C-shaped frame having a pair of apertured ears extending therefrom in alignment with selected ones of the housing apertures; a mounting bracket for the housing and solenoid operator, including a bracket portion extending between the housing and aforementioned ears; said bracket portion having a series of apertures corresponding to an even multiple of the housing apertures, said bracket portion apertures being concentrically arranged with respect to the valve seat and evenly spaced from one another so as to be alignable with the housing apertures; and securing elements extending through a selected one of the solenoid operator ears and the aligned apertures in the bracket portion and housing.

4. In a fluid valve having a valve body formed with an annular inlet chamber in one of its faces, and an outlet chamber extending concentrically within the inlet chamber and separated therefrom by an annular valve seat;

a diaphragm seated on said one valve body face so as to overlie the two chambers and intervening valve seat;

a cover structure comprising a cup-like section having a peripheral flange overlying the peripheral edge of the diaphragm, and a tubular guide portion extending axially outwardly from the cup-like section;

said diaphragm having a first port in a portion thereof overlying the annular inlet chamber, and a second port in a portion thereof overlying the outlet chamber;

an armature slidably positioned within the tubular guide portion for opening and closing the second port to thereby control the movement of the diaphragm;

a bracket for mounting the valve body comprising an annular plate-like bracket portion seated on said one valve body face so that an inner peripheral portion thereof overlies the flange on the aforementioned cup-like section;

and a multiplicity of evenly spaced headed securing elements concentrically arranged about the armature and extending through the plate-like bracket portion into the valve body;

the improvement comprising a solenoid operator for the armature including a C-shaped frame having a web wall extending generally parallel to the tubular guide portion, a first flange extending right angularly from the web wall around the tubular guide portion just outwardly of the aforementioned cup-like section, and a second flange extending right angularly from the web wall beyond the outer end of the tubular guide portion;

a solenoid coil nested within the C-shaped frame in surrounding relation to the tubular guide portion; terminals for the coil extending laterally outward therefrom;

and means for adjustably mounting the C-shaped frame and solenoid coil on the mounting bracket comprising a leg extending from the frame toward the plate-like bracket portion, and an apertured ear extending from the leg along the face of the plate-like bracket portion; the aperture in the ear being of sufficient size to enable any one of the aforementioned securing elements to extend therethrough.

5. In a fluid valve having a valve body formed with an annular inlet chamber in one of its faces, and an outlet chamber extending concentrically within the inlet chamber and separated therefrom by an annular valve seat;

a diaphragm seated on said one valve body face so as to overlie the two chambers and intervening valve seat;

a cover structure comprising a cup-like section having a peripheral flange overlying the peripheral edge of the diaphragm, and a tubular guide portion extending axially outwardly from the cup-like section;

said diaphragm having a first port in a portion thereof overlying the annular inlet chamber, and a second port in a portion thereof overlying the outlet chamber;

an armature slidably positioned within the tubular guide portion for opening and closing the second port to thereby control the movement of the diaphragm;

a bracket for mounting the valve body comprising an annular plate-like bracket portion seated on said one valve body face so that an inner peripheral portion thereof overlies the flange on the aforementioned cup-like section;

and a multiplicity of evenly spaced headed securing elements concentrically arranged about the armature and extending through the plate-like bracket portion into the valve body;

the improvement comprising a solenoid operator for the armature including a C-shaped frame having a web wall extending generally parallel to the tubular guide portion, a first flange extending right angularly from the web wall around the tubular guide portion just outwardly of the aforementioned cup-like section, and a second flange extending right angularly from the web wall beyond the outer end of the tubular guide portion;

a solenoid coil nested within the C-shaped frame in surrounding relation to the tubular guide portion; terminals for the coil extending laterally outward therefrom;

and means for adjustably mounting the C-shaped frame and solenoid coil on the mounting bracket comprising two legs extending from one edge of the frame first flange toward the plate-like bracket portion, and an apertured ear portion extending from each leg along the face of the plate-like bracket portion; the aperture in each ear portion being of sufficient size to enable any one of the aforementioned securing elements to extend therethrough.

6. The combination of claim 5 wherein the plate-like bracket portion has a series of apertures corresponding to an even multiple of the headed securing elements, said bracket portion apertures being evenly spaced and arranged concentrically around the armature so that selected ones of the bracket portion apertures can interchangeably accommodate the securing elements.

References Cited in the file of this patent
UNITED STATES PATENTS

| | | |
|---|---|---|
| 1,945,724 | Beebe | Feb. 6, 1934 |
| 2,887,125 | Tucien | May 19, 1959 |
| 2,914,034 | Becker | Nov. 24, 1959 |

UNITED STATES PATENT OFFICE
CERTIFICATE OF CORRECTION

Patent No. 3,080,889                                        March 12, 1963

Thomas E. Noakes

It is hereby certified that error appears in the above numbered patent requiring correction and that the said Letters Patent should read as corrected below.

Column 3, line 65, for "cnetral" read -- central --; column 5, line 55, after "apertures" insert --,and the ear aperture --.

Signed and sealed this 24th day of September 1963.

(SEAL)
Attest:

ERNEST W. SWIDER                                    DAVID L. LADD
Attesting Officer                                       Commissioner of Patents